F. M. PATTERSON.
VALVE.
APPLICATION FILED APR. 12, 1916.
1,257,020.
Patented Feb. 19, 1918.
2 SHEETS—SHEET 1.
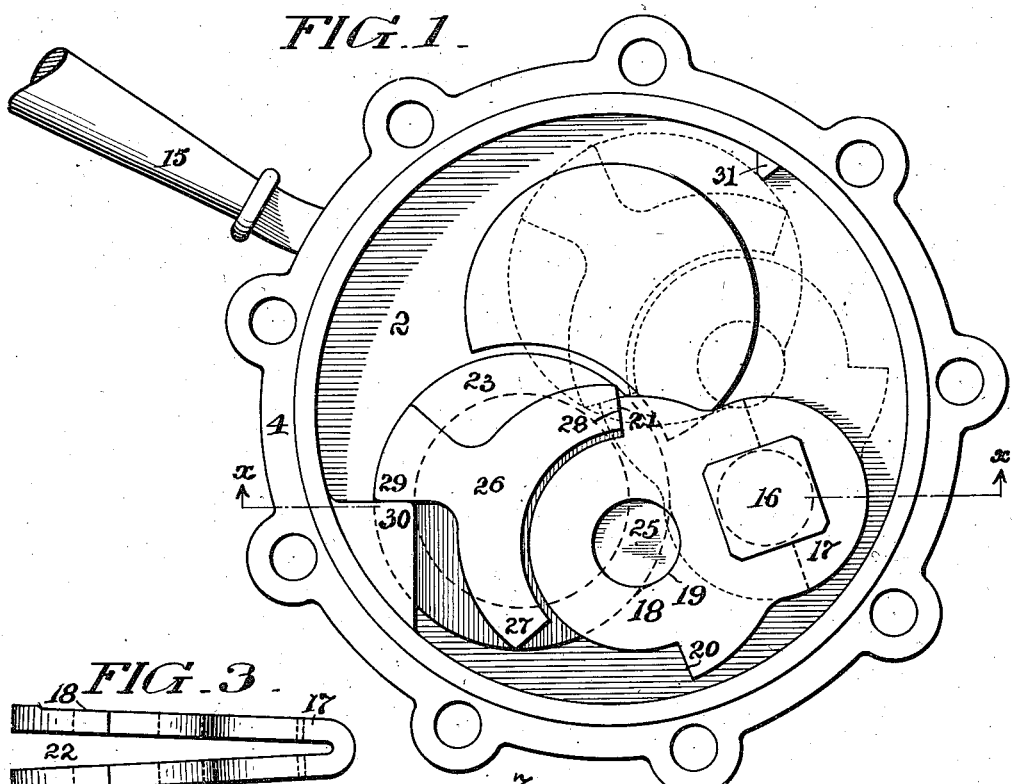
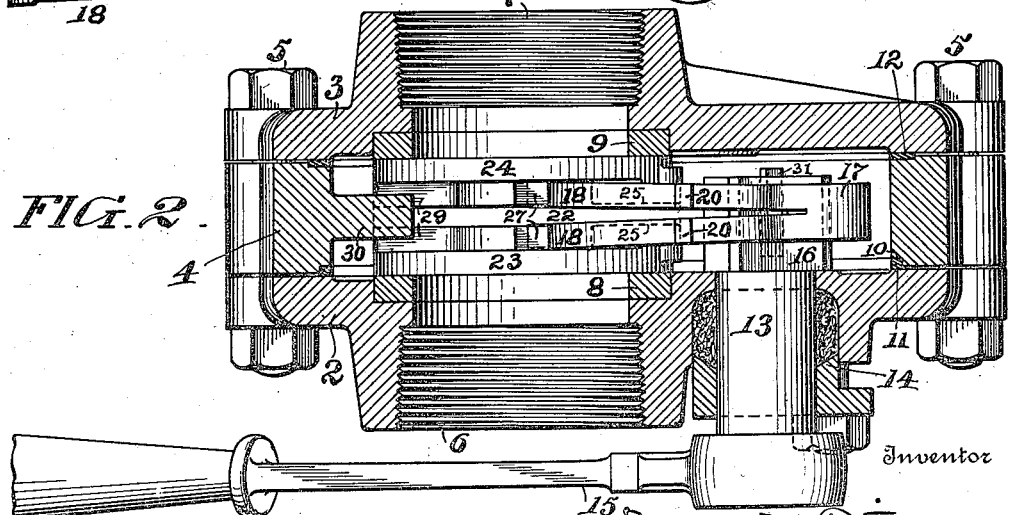
Witness
Daniel Webster, Jr.
E. W. Smith.
Inventor
Franklin M. Patterson
By
Attorney F. M. PATTERSON.
VALVE.
APPLICATION FILED APR. 12, 1916.
1,257,020.
Patented Feb. 19, 1918.
2 SHEETS—SHEET 2.
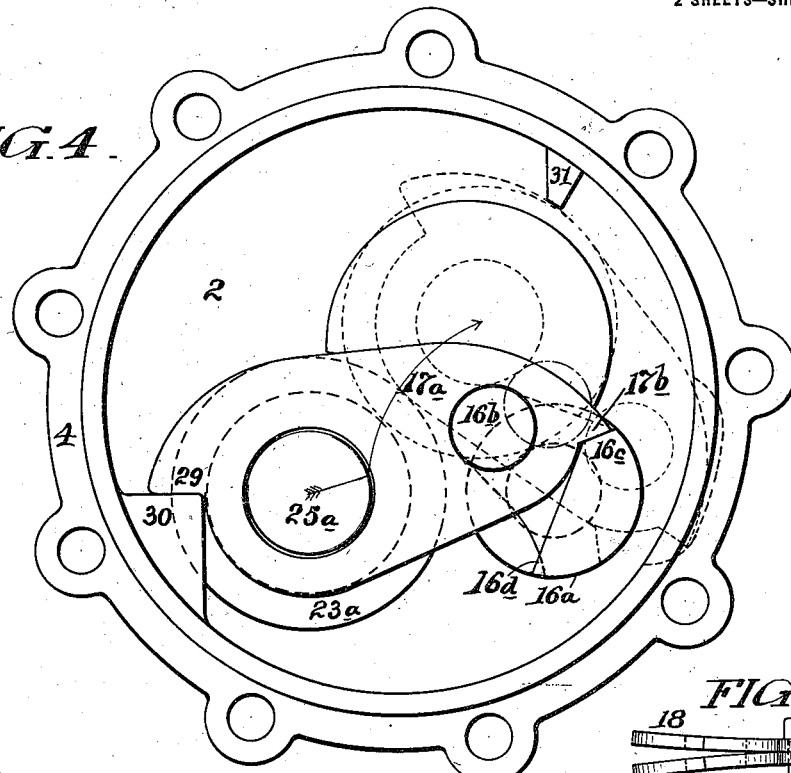
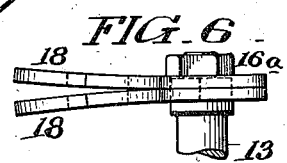
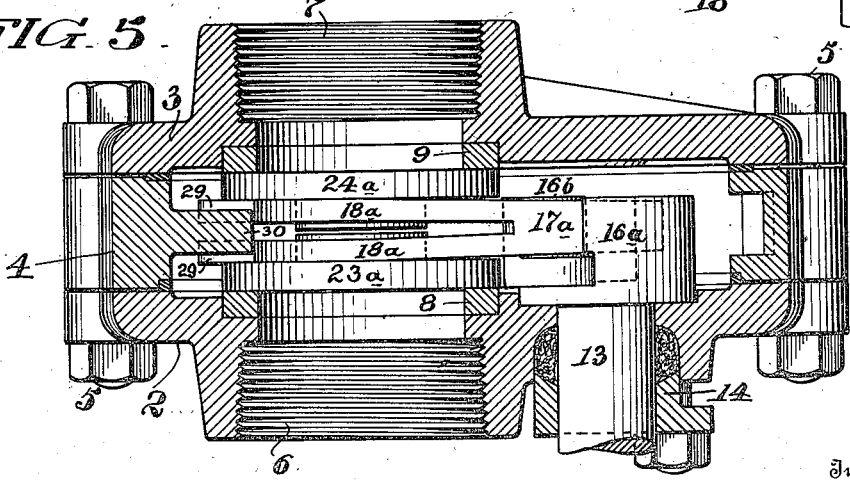
Witness
Daniel Webster Jr.
E. W. Smith.
Inventor
Franklin M. Patterson
By
Attorney

UNITED STATES PATENT OFFICE.

FRANKLIN M. PATTERSON, OF JERSEY CITY, NEW JERSEY, ASSIGNOR, BY MESNE ASSIGNMENTS, TO EVERLASTING VALVE COMPANY, A CORPORATION OF NEW JERSEY.

VALVE.

1,257,020.      Specification of Letters Patent.     Patented Feb. 19, 1918.

Application filed April 12, 1916. Serial No. 90,718.

*To all whom it may concern:*

Be it known that I, FRANKLIN M. PATTERSON, a citizen of the United States, and resident of Jersey City, county of Hudson, and State of New Jersey, have invented an Improvement in Valves, of which the following is a specification.

The object of my invention is to provide a construction of quick-opening through valve which shall embody easy manipulation, durability and simplicity of construction.

In valves of this type, where the pressure to be controlled is large, or where the diameter of the orifice is such as to provide an area sufficient with a moderate working pressure to create an excessive friction between the valve piece and its seat, the operation of opening the valve necessitates the application of considerable power, which, if applied directly, is too great for easy manipulation with a throw of lever in a normally available space, and if applied through gearing, the operation of the valve becomes objectionably slow. Furthermore, the great resistance which must be initially overcome in starting the valve piece in uncovering the port, causes excessive wear upon the spindle and bearing with a tendency to leakage. These conditions are entirely overcome by my present invention, which has for its specific object the imparting to the valve piece of a slipping preliminary motion in opening the valve and until the difference in pressures upon opposite sides of the valve piece has become in a measure, so greatly reduced as to permit the valve piece to be easily shifted, after which the valve piece is directly and positively moved with the spindle and hand lever.

My object is further to form the body of the valve of forged steel to secure strength, lightness and accuracy of shape and finish, said body formed of three parts bolted together and so united that two of the parts are packed by an annular packing of relatively narrow width, and the remaining part is held in place upon an annular packing of relatively great width and small thickness to permit proper assemblage initially and for repairs without materially reducing the distance between the two valve seat walls and between which the valve pieces and their operating parts are located.

With these and other objects in view, my invention consists in the means hereinafter set forth and more particularly defined in the claims; and my invention will be better understood by reference to the drawings, in which:—

Figure 1 is a plan view of my improved valve with the upper head of the valve body removed to expose the interior. Fig. 2 is a sectional view of the complete valve taken on line $x$—$x$ of Fig. 1; Fig. 3 is a side elevation of a modified form of spring swinging arm for operating the valve pieces; Fig. 4 is a plan view with the upper head removed showing a modification of my invention; Fig. 5 is a cross section of the modified construction of valve shown in Fig. 4; and Fig. 6 is a modification showing another manner of making the spring swinging arm for operating the valve pieces and for its attachment to the operating spindle.

The body consists of the annular or ring part 4 and the two head portions 2 and 3 which are respectively clamped upon the opposite sides of the annular part 4, all of said parts 2, 3 and 4 provided with holes through which bolts 5 pass for clamping the said parts together. Preferably these parts are of general circular shape, but I do not restrict myself thereto. Each of the heads 2 and 3 are respectively provided with ports 6 and 7, said ports preferably arranged in direct alinement and to one side of the axial line of the body. These ports are shown as screw-threaded for attachment to pipes, but it is manifest that they may be formed in any well known manner for providing suitable connection with pipes or conduits, and I therefore do not restrict my invention to screw-threaded ports. It will be observed that at one side of the annular part 4 there is shown an annular narrow groove 10, but of considerable depth, and that within said groove is a narrow packing 11 for making a tight joint with the head 2. As the packing is narrow, it will permit the two parts 2 and 4 to be drawn very close together to form a tight joint, and when this is done the depth of the valve chamber thus produced by the part 4 is relatively fixed. The annular packing 12 between the other head 3 and the annular part 4 is relatively thin and wide in cross section, so that when this head 3 is clamped in position it will not materially vary the depth of the valve chamber. It will be understood that the head 3 might be removed and replaced a number of times and the wide packing 12 would not cause a material change in the distance between the two heads 2 and 3. These packing gaskets 11 and 12 may be made of lead or ductile metal such as copper or any suitable alloy. While I have described a special packing to be used between the several parts of the body, it will be understood that I do not restrict myself thereto as any well known form of packing may be used if so desired.

The head 2 is provided with a stuffing-box and bearing 14 through which the rocking spindle 13 extends and in which it is journaled. I have also shown the valve seats 8 and 9 as formed of annular steel, nickel or bronze bushings set into annular grooves surrounding the inner ends of the ports 6 and 7 of the heads, said seats being replaceable when worn.

The rocking spindle 13 may be operated by a handle 15 secured to its outer end; and the inner end of the spindle is formed with a polygonal head 16 (substantially square by way of example) which is larger than the spindle and seats upon the inner face of the head 2 to provide a tight joint and hold the spindle from working loose. Fitting over the head 16 of the spindle is a swinging arm 17 having a hole so fitting the part 16 that they move as a unit, while permitting the arm 17 to position itself longitudinally upon the said part 16 as may be required. The free end of the arm 17 is split as at 22 to provide two spring parts 18 having holes 19 and shoulders 20 and 21 respectively upon opposite sides of the holes. The total radial length of the arm is approximately such as would preferably reach the middle of the valve pieces 23 and 24. These valve pieces each have a hinge hub 25 fitting the holes 19 in the parts 18 of the arm 17 so that they are in effect hinged to these parts 18; and said valve pieces have each a back projection 26 providing three shoulders 27, 28 and 29; the shoulders 27 and 28 respectively coöperating with the shoulders 20 and 21 of the swinging arm, and the remaining shoulder 29 coöperating with an abutment 30 projecting laterally from the interior of the annular or ring-shaped part 4 of the body. While the spring parts 18 of the swinging arm 17 hold the two valve pieces 23 and 24 upon their seats 8 and 9, the special construction of the shouldered parts permits a rotary slipping movement of the valve pieces upon the swinging arm in opening and closing the valve and in this way enabling the valve to be easily operated. As shown in Fig. 1, the valve is closed, and if it is to be opened the following operation takes place: The handle lever 15 is thrown to the right to rock the spindle and its head 16 and with it the arm
17. As the parts 18 move upward the hinge hubs 25 of the valve pieces are moved upward causing the valve pieces to swing about the contacting points between the shoulders 29 and abutment 30. This will continue until the shoulders 20 contact with the shoulders 27. When this is accomplished, the further swinging of the arm 17 carries the valve pieces over to the dotted position and to one side of the ports. During the operation, up to the time the shoulders 29 leave the abutment 30 the parts 18 and valve pieces are acting like toggles, each of said parts rotating about a different axis and the valve pieces gradually uncovering enough of the ports to permit the flow of the fluid and relief of the pressure upon the valve piece upon the outlet port. The pressure upon the valve piece of the inlet port need not be considered, as said pressure reduces the friction; but both valve pieces should be moved simultaneously, because when the outlet port is being opened the valve piece of the inlet port should not be made to take an excessive strain, and besides it must have the same timed movements so that the valve may be reversed according to requirements.

After the outlet valve piece has partly opened its port, the heavy pressure of the valve piece upon its seat is removed, and then the final opening movement is more easily performed. The reason for this is, that when the valve piece is swinging about its contact point with the abutment 30 as an axis, the power to move it is only approximately one-fourth that necessary to move it if positively moved with the swinging arm 17 as has heretofore been the practice, and hence a reasonably short lever 15 is all that is required to operate the valve under conditions which would, with the former constructions, have been practically impossible. When the spindle 16 has been rocked to move the valve pieces 23 and 24 into the dotted position, Fig. 1, said valve pieces will come into contact with the lug 31 on the side of the annular part 4 of the body, and at which time the ports will be fully open. In closing the valve, the reverse movements take place. As the rocking spindle 13 is rotated leftwise in Fig. 1, the swinging arm 17 will be moved toward the ports, and if the friction of the valve pieces 23 and 24 is sufficient upon the guide surfaces to prevent their falling freely with the arm, the movement of the arm will cause the valve pieces to swing about the axis of the bearing 19 until the shoulder 21 of the swinging arm abuts against the shoulder 28 on the valve pieces, after which the swinging arm and valve pieces move as a unit until the shoulders 29 of the valve pieces rest snugly upon the abutment 30, as shown in full lines in Fig. 1. It is not necessary that the abutment 21 of the swinging arm 17 shall positively contact with the abutment 28 of the valve pieces before starting them to their return position in closing the valve, but it is likely that in practically all cases the friction of the valve pieces against their guiding surfaces on the heads of the casing will cause a toggle action between the swinging arm and the valve pieces immediately the closing operation begins, and in any event, this action would take place when the valve pieces would be subjected to the pressure of the fluid flowing through the ports as soon as they began to close their ports. It will be furthermore understood that it is possible that in closing the valve, the valve piece on the discharge port would have more friction than the valve piece on the inlet port, and therefore it will be understood that these two valve pieces might not move in exact synchronism, but that the contacting of the shoulder 28 with the shoulder 21 would take place more quickly on the valve piece controlling the discharge port than the valve piece controlling the inlet port, because there will be greater friction on the discharge valve piece than on the inlet valve piece. In any event, both valve pieces are positively brought to the position indicated in solid lines in Fig. 1, when the rocking spindle has been fully rocked.

In the construction of swinging arm 17 shown in Fig. 2, the two parts 18 are formed by sawing or milling the edge of the plate parallel to its surfaces and springing the free ends of the two parts thus formed slightly apart to provide the space 22 between them, and also to provide the extreme ends of the swinging arm with contacting parts to press upon the valve pieces adjacent to their central portion, and in that way spring press them against their seats.

In place of making the swinging arm 17 of the construction shown in Fig. 2, it may be made of a stamped piece of sheet metal doubled over upon its face, as indicated in Fig. 3, the dotted lines therein indicating the apertures. Similarly, in Fig. 6, I have shown the swinging arm as made of two stamped pieces 18, fitting tightly upon the spindle 13 and clamped thereon by a nut 16ᵃ so that they swing positively with the rocking of the spindle. In this way the swinging arm may be made of good spring metal at a low cost.

Referring now to the construction shown in Figs. 4 and 5, the general structure of the body is the same as that already described. In this case, the valve pieces 23ᵃ and 24ᵃ are provided with central circular hubs 25ᵃ, and the swinging arm 17ᵃ is pivoted at 16ᵇ upon a crank pin of the rocking spindle 13, and also has bearings for the hubs 25ᵃ of the valve pieces 23ᵃ and 24ᵃ. Furthermore, this swinging arm 17ᵃ is provided with an extension 29 which contacts with the abutment 30 so that when the parts are as indicated in Fig. 4, the valve pieces will be in position to close the ports. The rocking spindle 13 has at its inner end a head 16ᵃ provided with a crank pin 16ᵇ parallel to the axis of the rocking spindle, and also is provided with two shoulders 16ᶜ and 16ᵈ. When the rocking spindle is rotated in the reverse direction to the hands of a watch, the heel 17ᵇ of the swinging arm contacts with the shoulder 16ᶜ and the swinging arm is then caused to swing positively with the rocking of the spindle and positively move the valve pieces into closed positions, and this is insured by the shoulder 29 of the swinging arm contacting with the abutment surface 30. When it is desired to open the valve, the rocking spindle is rotated in a direction corresponding to the hands of a watch (Fig. 4). When opening the valve, the crank pin 16ᵇ of the rocking spindle 13 will traverse successively from the solid line positions to the first dotted line position, and in doing so will pull the swinging arm 17ᵃ to the right, and this action will cause the shoulder 29 to slide along the abutment 30, and will move the valve pieces sufficiently to open the ports to allow pressure to flow into and through the valve and in that manner reduce the differential in pressures upon the opposite sides of the valve pieces. When this is done, the shoulder 16ᵃ will come into contact with the side of the swinging arm 17ᵃ and will then positively swing the arm with the spindle into the dotted position, Fig. 4, and said arm carries with it the valve pieces 23ᵃ and 24ᵃ so as to fully open the ports through the valve. When the swinging arm has reached its maximum position, it will be in contact with the lug 31. When reversing the motion to close the valve, the friction of the valve pieces upon the guiding surfaces of the heads will temporarily hold said valve pieces and permit the crank pin 16ᵇ of the spindle to be swung around until the shoulder 16ᶜ of the spindle comes into abutting relation with the shoulder 17ᵇ of the swinging arm 17ᵃ, after which the said swinging arm together with the valve pieces will be swung down by the further rocking of the spindle until the abutment 29 of the swinging arm positively contacts with the abutment 30. In this construction, as in the first described, the bifurcated swinging arm 17ᵃ provides the two spring portions 18ᵃ which press outwardly upon the valve pieces to cause them to properly seat with spring pressure.

It will be seen that the essential feature of my improved valve resides in the embodiment with the swinging valve pieces of means for introducing an increased leverage within the body of the valve between the spindle and the valve pieces and which shall, through the co-action of an abutment within the body, act to cause the valve pieces to slightly open the ports under the increased leverage and then impart to said valve pieces a uniform swinging action commensurate with the arc through which the spindle then travels. Furthermore, it will be understood that by my improved construction the valve pieces are first given a slow opening movement not commensurate with the arc through which the spindle is moved, and then subsequently a quick action to fully open the valve which is commensurate with the remaining arc through which the spindle is moved, whereby the valve pieces are first slowly moved sufficiently to relieve the pressure on the valve pieces and then quickly moved to open the valve fully, and thereby permit the valve to be successfully operated with a minimum application of power to the spindle.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a valve, the combination of a body having a chamber formed with inlet and outlet ports arranged in alinement and having oppositely directed valve seats, combined with a rocking spindle journaled in the casing to one side of the ports, valve pieces having hubs and adapted to the oppositely directed valve seats, and a swinging arm having apertures in which the hubs of the valve pieces are received, the said swinging arm connected to and movable with the rocking spindle and providing a mechanical toggle by which the valve pieces are given a preliminary sliding motion to partly open the ports with a relatively large rocking motion of the spindle, and in which said swinging arm later gives to the valve pieces a lateral traveling movement to fully open the valve ports and in doing so to cause the valve pieces to move through a curved path about the axis of the spindle as a center, the arc of said curved path being substantially equal to the arc through which the spindle is rotated.

2. In a valve, the combination of a body having a chamber formed with inlet and outlet ports arranged in alinement and having oppositely directed valve seats, combined with a rocking spindle journaled in the casing to one side of the ports, valve pieces having hubs and adapted to the oppositely directed valve seats, and a swinging arm having apertures in which the hubs of the valve pieces are received, the said swinging arm being connected and movable with the rocking spindle and providing a mechanical toggle by which the valve pieces are given a preliminary sliding motion to partly open the ports with a relatively large rocking motion of the spindle, and in which said swinging arm later gives to the valve pieces a lateral movement commensurate with the rocking motion of the spindle for fully opening the valve ports, said swinging arm bifurcated in the plane of its movement and providing independent spring arms for the respective valve pieces and by which they are normally pressed in yielding contact with their seats.

3. In a valve, the combination of a body having a chamber formed with inlet and outlet ports arranged in alinement and having oppositely directed valve seats, combined with a rocking spindle journaled in the casing to one side of the ports, valve pieces having hubs and adapted to the oppositely directed valve seats, a swinging arm having apertures in which the hubs of the valve pieces are received, the said swinging arm being connected and movable with the rocking spindle and providing a mechanical toggle by which the valve pieces are given a preliminary sliding motion to partly open the ports with a relatively large rocking motion of the spindle, and in which said swinging arm later gives to the valve pieces a lateral movement commensurate with the rocking motion of the spindle for fully opening the valve ports, an abutment on the valve casing, and means coöperating with the abutment for guiding the valve pieces in their initial opening movement.

4. In a valve, the combination of a valve casing having inlet and outlet ports providing valve seats in opposite alinement and a chamber between them, a rocking spindle journaled in the valve casing to one side of the ports, separate valve pieces adapted to the respective valve seats and having shoulders, a swinging arm carried by the inner end of the spindle and hinged to the valve pieces at a distance from the shoulders and having means for limiting the extent of the swinging movement of the said valve pieces upon the said arm, an abutment on the casing against which the shoulders of the valve pieces press and about which the valve pieces rotate during the initial opening movement thereof under the action of the swinging arm and rocking spindle, thereby imparting a slow movement to the valve pieces to partially open the ports with a relatively great movement of the swinging arm and rocking spindle and a final movement with the swinging arm commensurate with the movement of said arm and spindle whereby said valve pieces are moved away from the abutment and fully open the ports.

5. In a valve, the combination of a valve casing having inlet and outlet ports providing valve seats in opposite alinement and a chamber between them, a rocking spindle journaled in the valve casing to one side of the ports, separate valve pieces adapted to the respective valve seats and having shoulders, a swinging arm carried by the inner end of the spindle and hinged to the valve pieces at a distance from the shoulders and having means for limiting the extent of the swinging movement of the said valve pieces upon the said arm, an abutment on the casing against which the shoulders of the valve pieces press and about which the valve pieces rotate during the initial opening movement thereof under the action of the swinging arm and rocking spindle, thereby imparting a slow movement to the valve pieces to partially open the ports with a relatively great movement of the swinging arm and rocking spindle and a final movement with the swinging arm commensurate with the movement of said arm and spindle whereby said valve pieces are moved away from the abutment and fully open the ports; said swinging arm being bifurcated in a direction parallel to its plane of movement to provide two spring arms in which the valve pieces are respectively hinged and by which said valve pieces are yieldingly pressed against their respective seats.

6. In a valve, the combination of a valve casing having inlet and outlet ports and valve seats in alinement and a chamber between them, with a rocking spindle journaled in the valve casing to one side of the ports and valve seats, and a swinging arm carried on the inner end of the rocking spindle said arm bifurcated in the plane of its movement to provide two spring parts each of which is provided with an aperture and suitable shoulders, separate valve pieces adapted to the respective valve seats and each having a hub journaled in a hole of the respective spring parts of the swinging arm and also providing shoulders for contacting with the shoulders of said arm to limit the extent of swinging movement of the valve pieces upon the swinging arm, and said valve pieces also having shoulders at their sides most distant from the hubs, and an abutment on the casing against which the last mentioned shoulders of the valve pieces rest and about which the valve pieces swing under the initial movement of the rocking spindle and swinging arm to slightly open the valve and preliminary to the full swinging movement of the valve pieces with the swinging arm when fully opening the valve.

7. In a valve, the combination of a valve casing having inlet and outlet ports and valve seats arranged in alinement and with a chamber between them, a rocking spindle journaled in the casing to one side of the ports, valve pieces spring-pressed in opposite directions against the respective valve seats, an abutment with which the valve pieces contact at one side of the ports and about which the said valve pieces may rock, a swinging arm connected with the inner end of the rocking spindle and jointed with the valve pieces to form a toggle whereby the valve pieces may be rocked about the abutment to impart an initial opening movement and then swing bodily with the swinging arm away from the abutment to fully open the ports.

8. In a valve, the combination of a casing consisting of an annular body having a deep groove along one face adjacent to the inner wall, two outer heads respectively having inlet and outlet ports and respectively fitting the opposite faces of the annular body, clamping bolts for holding the heads and body tightly together, a deep metallic packing of relatively small radial thickness fitting the deep groove of the annular body and clamped between it and one of the heads, and a thin metallic gasket between the opposite face of the body and the other head and having relatively great radial width as compared to the width of the packing between the body and the other head, and valve devices for controlling the ports.

9. In a valve, the combination of a casing having inlet and outlet ports and valve seats and an intermediate chamber, a rocking spindle journaled in the casing to one side of the ports, two oppositely directed valve pieces for the respective valve seats, means to rock the spindle, and operative connections between the rocking spindle and the valve pieces for imparting a relatively slow opening movement to the valve pieces for a given preliminary rocking motion of the spindle and a relatively greater opening movement of the valve pieces with a corresponding rocking movement of the spindle whereby a movement of the spindle through a given arc will impart a relatively small initial movement of the valve pieces in the preliminary opening of the valve ports and a further movement of the spindle will move the valve pieces through an arc equal to the arc through which the secondary movement of the spindle is moved.

In testimony of which invention, I hereunto set my hand.

FRANKLIN M. PATTERSON.

Witnesses:
PERRY HAYNES,
WM. STEFFLER.